United States Patent
Yang et al.

(10) Patent No.: US 8,265,172 B2
(45) Date of Patent: Sep. 11, 2012

(54) METHOD AND APPARATUS FOR ANALYTICAL AND EMPIRICAL HYBRID ENCODING DISTORTION MODELING

(75) Inventors: Hua Yang, Plainsboro, NJ (US); Jill MacDonald Boyce, Manalapan, NJ (US)

(73) Assignee: Thomson Licensing, Boulogne-Billacourt (FR)

( * ) Notice: Subject to any disclaimer, the term of this patent is extended or adjusted under 35 U.S.C. 154(b) by 588 days.

(21) Appl. No.: 12/310,460

(22) PCT Filed: Aug. 21, 2007

(86) PCT No.: PCT/US2007/018481
§ 371 (c)(1),
(2), (4) Date: Feb. 25, 2009

(87) PCT Pub. No.: WO2008/027250
PCT Pub. Date: Mar. 6, 2008

(65) Prior Publication Data
US 2009/0232225 A1    Sep. 17, 2009

Related U.S. Application Data

(60) Provisional application No. 60/823,942, filed on Aug. 30, 2006.

(51) Int. Cl.
*H04N 11/02* (2006.01)
*H04N 11/04* (2006.01)
(52) U.S. Cl. .............................. 375/240.27; 375/240.12
(58) Field of Classification Search .................. None
See application file for complete search history.

(56) References Cited

U.S. PATENT DOCUMENTS

| | | | |
|---|---|---|---|
| 5,691,770 A | 11/1997 | Keesman et al. | |
| 6,434,196 B1 * | 8/2002 | Sethuraman et al. | 375/240.12 |
| 6,873,740 B1 | 3/2005 | Devillers et al. | |
| 2002/0064228 A1 * | 5/2002 | Sethuraman et al. | 375/240.12 |
| 2004/0240556 A1 * | 12/2004 | Winger et al. | 375/240.18 |
| 2006/0104527 A1 | 5/2006 | Koto et al. | |

FOREIGN PATENT DOCUMENTS

| | | |
|---|---|---|
| CN | 1157080 A | 8/1997 |
| CN | 1505787 A | 6/2004 |
| JP | 2002-185966 A | 6/2002 |
| JP | 2006-140758 A | 6/2006 |
| WO | 2004/064414 A2 | 7/2004 |

OTHER PUBLICATIONS

Cai et al.: "Optimal Bit Allocation For Low Bit Rate Video Streaming Applications," IEEE ICIP 2002, pp. 73-76.

Hang et al.: "Source Model for Transform Video Coder and Its Application—Part I: Fundamental Theory," IEEE Transactions on Circuits and Systems for Video Technology, vol. 7, No. 2, Apr. 1997, pp. 287-298.

(Continued)

*Primary Examiner* — Clemence Han
(74) *Attorney, Agent, or Firm* — Robert D. Shedd; Paul P. Kiel

(57) ABSTRACT

There are provided a method and apparatus for analytical and empirical hybrid encoding distortion modeling. An apparatus includes a distortion calculator for modeling video encoding distortion by dividing the video encoding distortion into a first portion and a second portion, calculating the first portion using empirical calculations, and calculating the second portion using analytical calculations.

23 Claims, 4 Drawing Sheets

OTHER PUBLICATIONS

He et al.: "Joint Source Channel Rate-Distortion Analysis for Adaptive Mode Selection and Rate Control in Wireless Video Coding", IEEE Transactions on Circuits and Systems for Video Technology, vol. 12, No. 6, Jun. 2002, pp. 511-523.

He et al.: "Object-Level Bit Allocation and Scalable Rate Control for MPEG-4 Video Coding," Dept. of Electrical & Computer Engineering, University of California, pp. 63-66, 2001.

He et al.: "A Unified Rate-Distortion Analysis Framework for Transform Coding," IEEE Transactions on Circuits and Systems for Video Technology, vol. 11, No. 12, Dec. 2001, pp. 1221-1236.

Yang et al.: "A Normalized Rate-distotion Model for H.263-compatible Codecs and Its Application to Quantizer Selection", IEEE 1997, pp. 41-44.

Jackson et al.: "Fast Rate-Distortion Estimation and Optimization for Wavelet Video Coding," Proceedings of the 3rd International Symposium on Image and Signal Processing and Analysis, Sep. 18, 2003, pp. 233-238, XP0010703693.

Kamaci et al.: "Frame Bit Allocation for the H.264/AVC Video Coder Via Cauchy-Density-Based Rate and Distortion Models," IEEE Transactions on Circuits and Systems for Video Technology, vol. 15, No. 8, Aug. 2005. pp. 994-1006.

Li et al.: "Adaptive Rate Control with HRD Consideration," Joint Video Team (JTV) of ISO/IEC MPEG & ITU-T VCEG, May 20-26, 2003, Institute of Computing Technology, Chinese Academy of Sciences, Beijing, China, pp. 1-18, XP-002328786.

Lin, L-J et al.: "Bit-Rate Control Using Piecewise Approximated Rate-Distortion Characteristics," IEEETransactions on Circuits and Systems for Video Technology, vol. 8, No. 4, Aug. 1998. pp. 446-459.

Tu et al.: "Statisttical Rate-Distortion Estimation for H.264/AVC Coders," IEEE International Symposium in Kos, Greece, May 21-24, 2006, pp. 365-368, XP010938427.

He, et al. "Optimum Bit Allocation and Accurate Rate Control for Video Coding via p-Domain Source Modeling," IEEE Transactions on Circuits and Systems for Video Technology, vol. 12. No. 10, Oct. 2002, pp. 840-849, XP0011071878.

International Search Report, dated Mar. 28, 2008.

\* cited by examiner

METHOD AND APPARATUS FOR ANALYTICAL AND EMPIRICAL HYBRID ENCODING DISTORTION MODELING

CROSS-REFERENCE TO RELATED APPLICATIONS

This application claims the benefit, under 35 U.S.C. §365 of International Application PCT/US2007/018481 filed Aug. 21, 2007 which was published in accordance with PCT Article 21(2) on Mar. 6, 2008 in English and which claims the benefit of U.S. provisional patent application No. 60/823,942 filed Aug. 30, 2006.

TECHNICAL FIELD

The present principles relate generally to video encoding and, more particularly, to a method and apparatus for an analytical and empirical hybrid encoding distortion modeling.

BACKGROUND

In video encoding, it is desirable to determine how best to accurately estimate the rate-distortion (RD) curve of a video frame. When the rate-distortion characteristics of a frame are known, one can optimally allocate the limited coding resources, usually the coding bit rate, to different frames such that an optimized overall coding performance is achieved. Most often, the problem is formulated as rate-distortion optimized frame-level bit rate allocation, where the objective is to minimize either the average or the maximum mean squared error (MSE) source coding distortion, subject to a specific total bit rate and buffer constraint. Hence, whether or not the rate-distortion characteristics of a frame can be accurately estimated will critically affect the resultant overall rate control performance.

In practice, existing video coding standards specify a finite number of quantization scales for encoding. Effective rate control can be carried out knowing the resultant rate-distortion data of a frame after applying each legitimate quantization scale. For convenience, in our discussion, it is presumed that the prediction residue data for transform coding is already available. The problem now is to calculate all the R-Q and D-Q data for all the valid Q's, where "R-Q" denotes the resultant coding bits with a certain Q, "D-Q" denotes the resultant coding distortion with a certain Q, and "Q" denotes the quantization scale, i.e., quantization step size. Note that there is one-to-one mapping between Q and the quantization parameter (denoted by QP) defined in video coding standards and recommendations. For example, in the International Organization for Standardization/International Electrotechnical Commission (ISO/IEC) Moving Picture Experts Group-4 (MPEG-4) Part 10 Advanced Video Coding (AVC) standard/international Telecommunication Union, Telecommunication Sector (ITU-T) H.264 recommendation (hereinafter the "MPEG-4 AVC standard"), QP ranges from 0 to 51, and each QP corresponds to a certain quantization step size or scale Q. To exactly calculate the rate-distortion data, one has to exhaustively encode the frame with all the Q's, using brut force. Although exhaustive calculation gives the highest accuracy, it also incurs prohibitive computation complexity and, thus, in practice, many various rate-distortion models have been proposed, targeting accurate rate-distortion data estimation with low or reduced complexity.

Most existing rate-distortion models are analytical models. In these analytical models, R or D are represented as an explicit function with respect to the quantization scale Q and the variance of the residue signal $\sigma^2$.

We know that in principle the resultant rate and distortion of coding a frame is related to not only the quantization scale but also the characteristic of the source video signal itself. However, the characteristic of source video signals are non-stationary. Hence, in analytic models, the variance of the prediction residue signal is commonly adopted to account for non-stationary video signals. Regarding distortion modeling, while the distortion estimate may bear the simple form of a unified function with respect to Q and $\sigma^2$ in one prior art distortion estimating approach, in another approach D can be more accurately estimated via a piecewise function which gives a different D-Q or D-$\sigma^2$ relationship according to the different relative magnitude of Q with respect to $\sigma$. The most notable advantage of analytical rate-distortion modeling is its low computation complexity. One only needs to first calculate $\sigma^2$, and then can directly estimate R or D according to the prescribed function. The variance calculation can be simply conducted on a spatial domain residue signal, requiring no transformation and quantization operations and, thus, incurs very low computation complexity. However, the disadvantage of D-Q analytic modeling is its compromised estimation accuracy, which is mostly because of the inadequacy of using only the variance to fully account for the impact of video signal non-stationarity in rate-distortion estimation. This shortcoming is ameliorated in the more recent $\rho$-domain analytic RD models, where instead of the traditional R-Q and D-Q models, the. new model is based on the percentage of zero quantized coefficients, denoted by $\rho$, which bears a one-to-one mapping with Q. Note that $\rho$ is an outcome of applying Q to the transformed residue signal, and thus, reflects not only the information of Q but also the information of the non-stationary source video signal. The $\rho$-domain models yield better modeling performance than the other existing Q-based models, while the price here is a little increased computation complexity due to the additional involvement of a Discrete Cosine Transform (DCT).

The analytic models assume a fixed explicit relationship between RD and Q (or $\rho$). However, in practice, the actual rate-distortion data of a frame renders an operational rate-distortion curve which, more often than not, is not smooth or piecewise smooth at all. This mismatch may greatly compromise the estimation accuracy of analytic models. To ensure high accuracy, while still reducing the complexity, an empirical approach was proposed, where exhaustive encoding is only conducted for a small set of selected Q's, and the rate-distortion data of the rest of the Q's are interpolated from the available ones. Although the modeling accuracy of the empirical model is better than that of analytic models, it requires multiple additional encoding operations, which still poses a significant amount of additional computation load, and may not be always acceptable in real-time video streaming systems.

It is also worthwhile noting that in terms of R modeling, the $\rho$-domain model already achieves high estimation accuracy, and the scope for further improvement is very limited. However, in terms of D modeling, both the $\rho$-domain model and the existing Q-based models cannot render as good an estimation performance as that of the $\rho$-domain R model.

SUMMARY

These and other drawbacks and disadvantages of the prior art are addressed by the present principles, which are directed to a method and apparatus for an analytical and empirical hybrid encoding distortion modeling.

According to an aspect of the present principles, there is provided an apparatus. The apparatus includes a distortion calculator for modeling video encoding distortion by dividing the video encoding distortion into a first portion and a second portion, calculating the first portion using empirical calculations, and calculating the second portion using analytical calculations.

According to another aspect of the present principles, there is provided an apparatus. The apparatus includes a video encoder for encoding image data by modeling video encoding distortion for the image data, wherein said encoder models the video encoding distortion by dividing the video encoding distortion into a first portion and a second portion, calculating the first portion using empirical calculations, and calculating the second portion using analytical calculations.

According to yet another aspect of the present principles, there is provided a method. The method includes modeling video encoding distortion. The step of modeling the video encoding distortion includes the steps of dividing the video encoding distortion into a first portion and a second portion, calculating the first portion using empirical calculations, and calculating the second portion using analytical calculations.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

Figure 1:
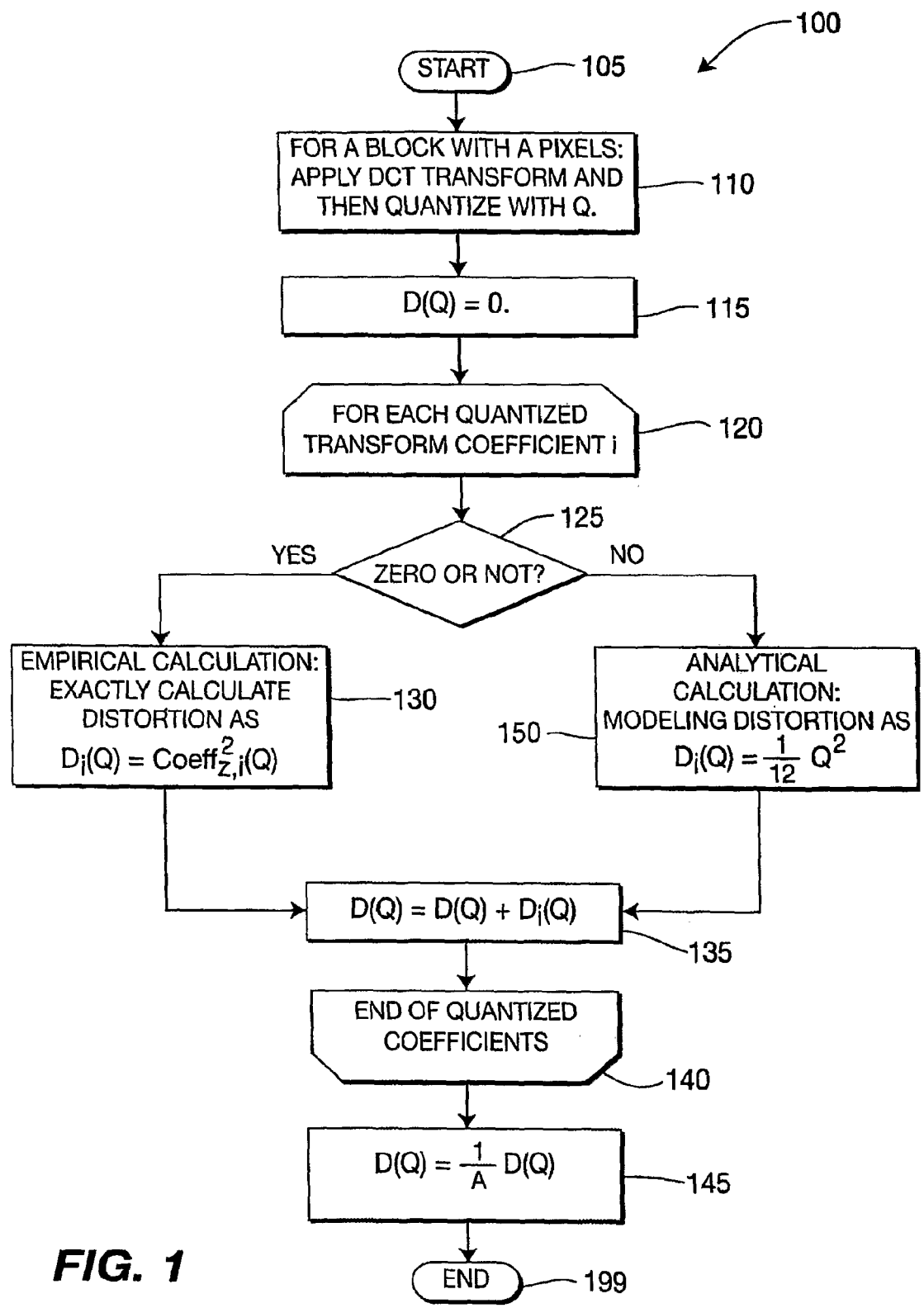
FIG. 1 is a flow diagram for an exemplary method relating to a hybrid distortion model, in accordance with an embodiment of the present principles.

The present principles are directed to a method and apparatus for an analytical and empirical hybrid encoding distortion modeling.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

It is to be appreciated that while one or more embodiments of the present principles are described herein with respect the MPEG-4 AVC standard, the present principles are not limited to solely this standard and, thus, may be utilized with respect to other video coding standards, recommendations, and extensions thereof, including extensions of the MPEG-4 AVC standard, while maintaining the spirit of the present principles.

Moreover, it is to be appreciated that that while one or more embodiments of the present principles are described herein with distortion of the luminance component, the present principles are equally applicable to distortion of the chrominance components. Thus, the present principles may be used with respect to distortion of the luminance component and/or chrominance components, while maintaining the spirit of the present principles.

Further, it is to be appreciated that the use of the term "and/or", for example, in the case of "A and/or B", is intended to encompass the selection of the first listed option (A), the selection of the second listed option (B), or the selection of both options (A and B). As a further example, in the case of "A, B, and/or C", such phrasing is intended to encompass the selection of the first listed option (A), the selection of the second listed option (B), the selection of the third listed option (C), the selection of the first and the second listed options (A and B), the selection of the first and third listed options (A and C), the selection of the second and third listed options (B and C), or the selection of all three options (A and B and C). This may be extended, as readily apparent by one of ordinary skill in this and related arts, for as many items listed.

As used herein, the term "empirical" is used to refer to the calculation of the concerned coding bits (R) or coding distortion (D) quantities. In some embodiments, such calculation may be exhaustive. As used herein, "exhaustive" and "substantially exhaustive" refer to exactly calculating the quantization distortion without any modeling simplification or approximation.

Moreover, as used herein, the term "analytical" is used to refer to the calculation of concerned coding bits (R) or coding distortion (D) quantities via analytical modeling.

Further, as used herein, the phrase "non-zero quantized coefficients" is used to refer to the transform coefficients that will not become zero after quantization with a particular Q. That is, the phrase "non-zero quantized coefficients" refers to transform coefficients that will have a non-zero value after quantization with a particular Q.

Also, as used herein, the phrase "zero quantized coefficients" is used to refer to the transform coefficients that will become zero after quantization with a particular Q. That is, the phrase "zero quantized coefficients" refers to transform coefficients that will have a zero value after quantization with a particular Q.

As noted above, the present principles are directed to a method and apparatus for an analytical and empirical hybrid encoding distortion modeling.

As further noted above, in terms of R modeling, the ρ-domain model already achieves high estimation accuracy, and the scope for further improvement is very limited. However, in terms of D modeling, both the ρ-domain model and the existing Q-based models cannot render as good an estimation performance as that of the ρ-domain R model.

In accordance with the present principles, we fill this gap with a new hybrid distortion model, which outperforms all the other existing models and achieves close-to-optimum modeling performance.

Thus, in an embodiment, a method and apparatus are provided for estimating the source coding mean squared error distortion characteristic of a frame. Unlike its predecessors, which are either analytic or empirical methods, the proposed model is an analytic and empirical hybrid model. An embodiment of this hybrid model is implemented with an effective table look-up approach. The resulting model has both the advantages of analytic modeling (with low computation complexity) and the advantages of empirical modeling (with high modeling accuracy), and can generally be applied in any frame-level rate-distortion optimization involved problems for improved optimization performance (e.g., frame-level bit allocation or bit allocation between source and channel coding of a frame).

Turning to FIG. 1, an exemplary method relating to a hybrid distortion model is indicated generally by the reference numeral 100.

The method includes a start block 105 that passes control to a function block 110. The function block 110, for a block with A pixels, applies a discrete cosine transform (DCT), quantizes a result of the transform with a particular quantization value (Q), and passes control to a function block 115. The function block 115 calculates the distortion relating to the particular quantization value Q, D(Q)=0, and passes control to a loop limit block 120. The loop limit block 120 performs a loop for each quantized transform coefficient i, and passes control to a decision block 125. The decision block 125 determines whether or not a current quantized transform coefficient i is zero. If so, then control is passed to a function block 130. Otherwise, control is passed to a function block 150.

The function block 130 performs an empirical calculation to exactly calculate the distortion as follows, $D_i(Q) \approx \text{Coeff}_{z,i}^2(Q)$, and passes control to a function block 135.

The function block 135 calculates $D(Q)=D(Q)+D_i(Q)$, and passes control to a loop limit block 140. The loop limit block 140 ends the loop over each quantized transform coefficient i, and passes control to a function block 145. The function block 145 calculates $$D(Q) = \frac{1}{A} D(Q),$$

and passes control to an end block 199.

The function block 150 performs an analytical calculation to model the distortion as follows, $$D_i(Q) = \frac{1}{12} Q^2,$$

and passes control to the function block 135.

As shown in FIG. 1, the hybrid distortion model includes two components, i.e., the empirically calculated distortion contribution from zero quantized coefficients, and the analytically calculated distortion contribution from non-zero quantized coefficients.

In an embodiment, the use of the analytical and empirical hybrid model for source coding distortion with a table look-up provides a model that accurately estimates the mean squared error quantization distortion for every quantization scale and, thus, achieves high modeling accuracy and low computation complexity, both at the same time.

In the basic rate-distortion modeling problem, it is commonly presumed that the input signal to transformation, quantization and entropy coding is available, and the task of rate-distortion modeling is to estimate the rate-distortion outcomes of applying different QPs onto this input signal. For example, in the MPEG-4 AVC standard, the concerned input signal is the residue signal after motion compensated prediction or intra-prediction. Note that when applying rate-distortion models in practical problems, one usually may not know the exact input signal prior to transform coding. For example, in the problem of frame-level bit allocation, one has to estimate the rate-distortion data of all the concerned frames without coding any one of them. Hence, it is impossible to know the exact prediction reference frame and macro-block coding modes of a frame at the time of frame-level bit allocation. The mismatch between the references and coding modes assumed in bit allocation and those adopted in actual encoding compromise the accuracy of basic rate-distortion modeling.

In accordance with an embodiment, for a certain frame and certain quantization scale Q, the resultant mean squared error distortion D(Q) is divided into two parts: distortion contribution of non-zero quantized coefficients $D_{nz}(Q)$ and that of zero quantized coefficients $D_z(Q)$. Note that in practice, the concerned distortion is usually distortion of the luminance component only. Hence, for convenience, in the present description, we also refer to luminance distortion. However, as noted above, the proposed model applies as well to distortion involving both the luminance and chrominance components. Here also, we ignore the clipping impact, and presume that the distortion in the frequency domain is the same as that in the spatial domain. Hence, we have the following:

$$D(Q) = \frac{1}{A}\sum_{i=1}^{A}(f_i - \hat{f}_i(Q))^2 \cong D_{nz}(Q) + D_z(Q). \quad (1)$$

Here, $f_i$ and $\hat{f}_i$ denote the original and reconstructed pixels of the frame, and A denotes the total number of pixels in a frame. Note that in the MPEG-4 AVC Standard, QP ranges from 0 to 51, and the relationship between QP and Q is roughly as follows:

$$Q \cong 2^{(QP-4)/6}. \quad (2)$$

We model quantization error of non-zero quantized coefficient as a random variable with uniform distribution and, thus, distortion of non-zero coefficients can be easily calculated as follows:

$$D_{nz}(Q) = (1 - \rho(Q)) \cdot \frac{1}{12}Q^2. \quad (3)$$

Here, $\rho(Q)$ denotes the percentage of zero quantized coefficients among all the transform coefficients of the frame, which has a one-to-one mapping with Q. The distortion of zero quantized coefficients is exactly calculated as follows:

$$D_z(Q) = \frac{1}{A}\sum_{i=1}^{A\rho(Q)} Coeff_{z,i}^2(Q). \quad (4)$$

Here, $Coeff_z(Q)$ denotes the magnitude of a coefficient that will be quantized to zero with quantization scale Q. To summarize, the overall source coding distortion is estimated as follows:

$$D(Q) = (1 - \rho(Q)) \cdot \frac{1}{12}Q^2 + \frac{1}{A}\sum_{i=1}^{A\rho(Q)} Coeff_{z,i}^2(Q). \quad (5)$$

In practice, the D-Q relationship of a frame may be estimated via a pre-analysis process before actual encoding, and the resultant estimated distortion from Equation (5) will then be used in frame-level bit allocation or rate control. As mentioned earlier, there is an inevitable mismatch between the references and coding modes assumed in pre-analysis and those adopted in actual encoding, which will compromise the accuracy of basic rate-distortion modeling. To compensate the mismatch impact, one new model parameter can be introduced to calculate the final distortion estimate as follows. Herein, $D_{Model}(Q)$ is the modeled distortion from Equation (5), $D_{Est}(Q)$ is the final distortion estimate, and $\alpha$ is the model parameter. In practice $\alpha$ can be adaptively updated with the actual encoding distortion results of the past frames.

$$D_{Est}(Q) = \alpha \cdot D_{Model}(Q). \quad (6)$$

Unlike existing distortion models, which are either analytic or empirical, the proposed model is a hybrid solution, where an analytic function is assumed for non-zero coefficient distortion, and for zero coefficients, their exact distortion contribution is calculated. It is to be noted that presuming uniform distribution for non-zero coefficient quantization error, and calculating the as-is distortion for zero coefficients, have been separately employed in source coding distortion modeling. However, unlike our proposed model, existing solutions all apply either one of the two practices in estimating the overall source coding distortion, depending on the different values of relative Q versus $\sigma$ magnitude, which thus leads to various piecewise analytic distortion models. Specifically, in these existing models, for a particular Q, if $Q/\sigma$ is less than a threshold, it is very likely that most of the coefficients will be non-zero after quantization and, hence, the overall distortion is estimated by $Q^2/12$. When $Q/\sigma$ is greater than a threshold, very likely, most of the coefficients will be quantized to zero. In this case, the overall distortion is simply estimated by $\sigma^2$. When presuming zero mean, $\sigma^2$ is just the distortion when all the coefficients are quantized to zero. In contrast, our hybrid model separately applies these two effective estimations on the actual non-zero and zero quantized coefficients, respectively, and is a more accurate model than the existing piecewise models.

In fact, the only factor in our model that may cause inaccuracy is the uniform distribution presumption on non-zero coefficients. Via extensive experiment, we found that this presumption is a highly accurate presumption in practice, as the estimated distortion is always very close to the actual distortion values. In contrast, both the analytic D-($\rho$,$\sigma$) relationship assumption of the $\rho$-domain model prior art approach and the smooth curve presumption for interpolation in a rate-distortion optimized frame-level bit rate allocation prior art approach are stronger modeling presumptions than our presumption, which result in inferior estimation accuracy compared to our proposed model. In experiments, we compare the estimation performance of our model with that of the $\rho$-domain analytic model described herein. Results show that our model consistently achieves better performance than the existing model.

In terms of computational complexity, similar to the existing $\rho$-domain models, our model also estimates the distortion in the transform domain. Thus, it requires a one time transform operation, which only incurs a marginal complexity increase. Especially, in the MPEG-4 AVC Standard, the adopted transform is an approximation to the original Discrete Cosine Transform, which involves lower computational complexity. A complexity that may be implicated by our model relates to the calculation of the percentage and distortion of the zero quantized coefficients. In the worst case, for each Q, one has to conduct quantization on all the transform coefficients, and exhaustively count the number and distortion of zero quantized coefficients, which may require significant computational complexity. Fortunately, in practice, there exists a fast look-up table algorithm for $\rho$ calculation, which can be extended in our case for $D_z(Q)$ calculation. With this fast algorithm, $D_z(Q)$ and $\rho(Q)$ for all the Q's can be acquired in one single pass of the table look-up calculation over all the coefficients, which also just marginally increases the complexity. However, there is some additional consumption of memory space for the storage of the look-up tables.

In practice, the proposed model can be used to estimate distortion characteristics of a frame for optimized frame-level bit allocation.

Figure 2:
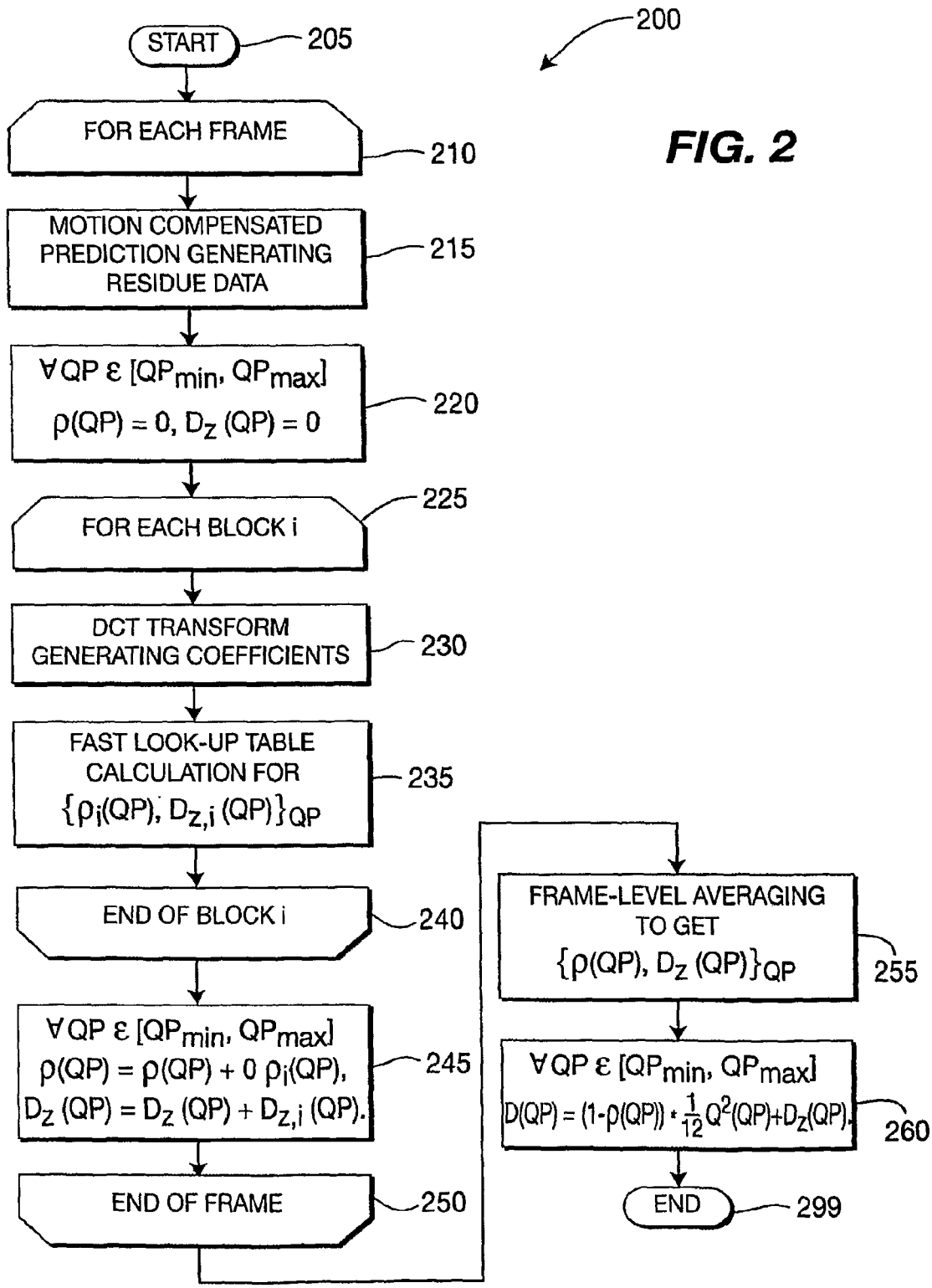
FIG. 2 is a flow diagram for an exemplary method for estimating the D-QP data of video frames, in accordance with an embodiment of the present principles.
Figure 3:
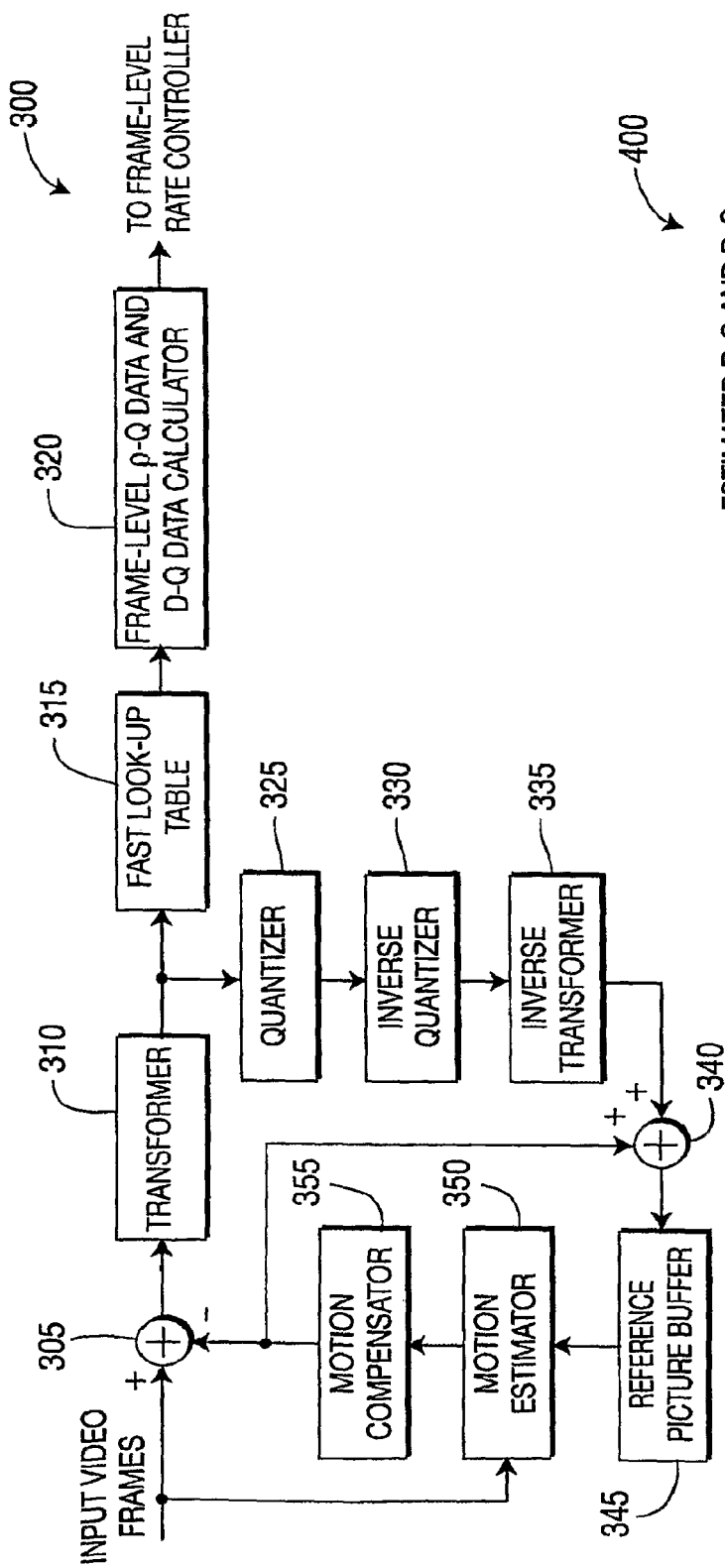
FIG. 3 is a block diagram for an exemplary pre-analyzer relating to generating estimated rate-distortion model data, in accordance with an embodiment of the present principles.
Figure 4:
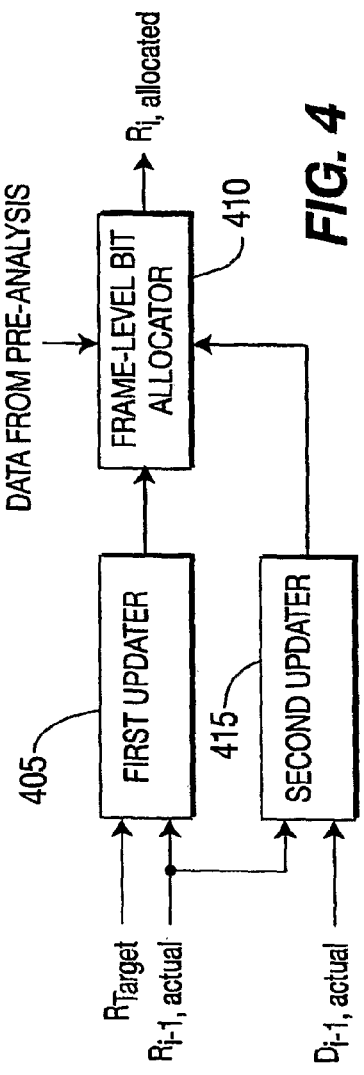
FIG. 4 is a block diagram for an exemplary frame-level rate controller to which the hybrid distortion model of FIG. 1 may be applied, in accordance with an embodiment of the present principles.
Figure 5:
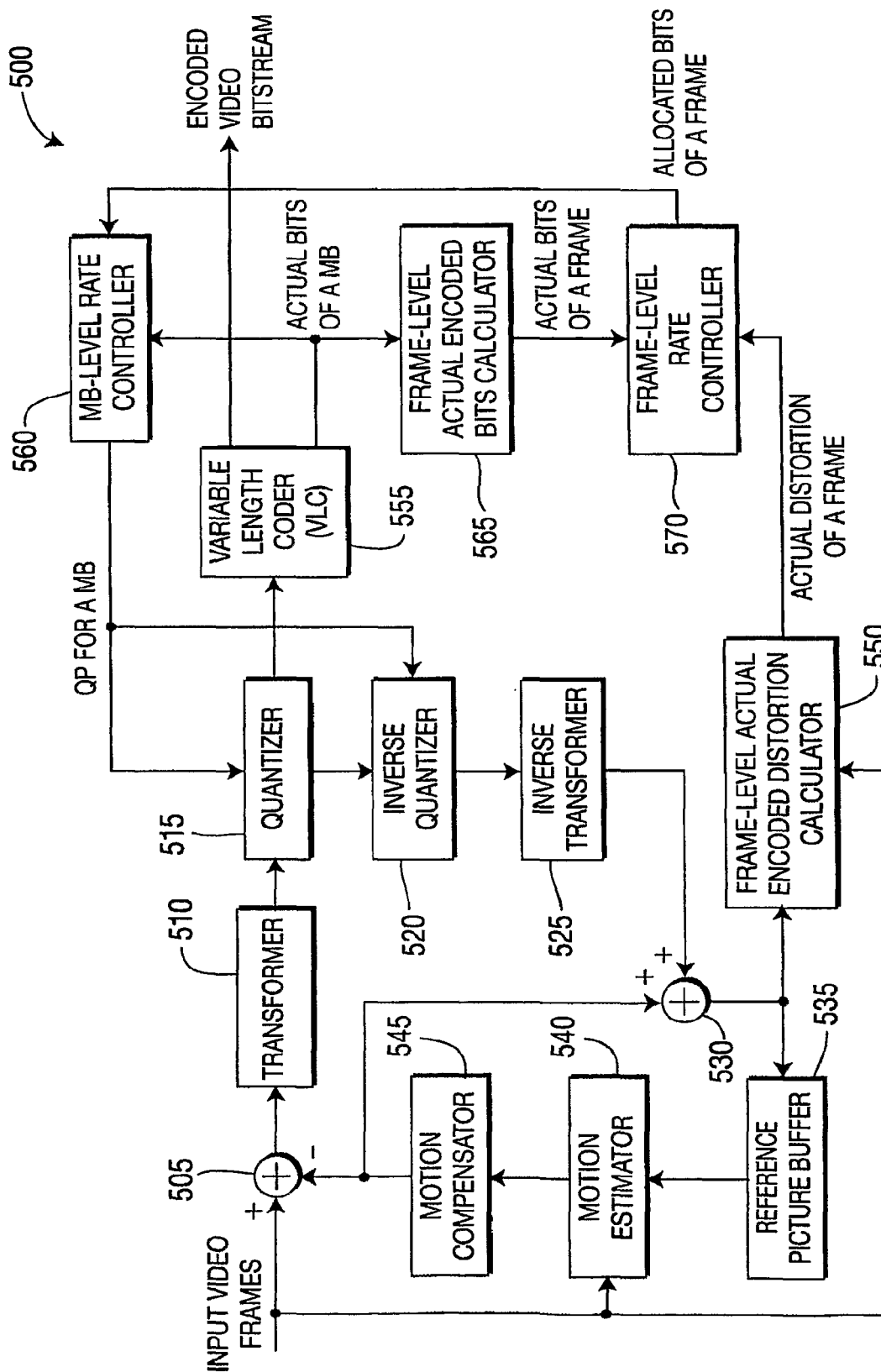
FIG. 5 is a block diagram for an exemplary video encoder that typically employs frame-level and MB-level rate control, in accordance with an embodiment of the present principles.

FIG. 2 and FIG. 3 provide an exemplary pre-analysis method and an exemplary pre-analyzer, respectively, for estimating the D-Q data of video frames. The resultant data is then used for frame-level bit allocation or rate control as shown in FIG. 4. It is to be appreciated that while FIG. 4 shows the use of the resultant data for frame-level bit allocation or rate control, given the teachings of the present principles provided herein, one of ordinary skill in this and related arts will readily be able to extend the use of the resultant data for frame-level bit allocation and/or rate control (e.g., in some embodiments, the data may be used for both), while maintaining the spirit of the present principles. An exemplary video encoder involving frame-level and MB-level rate control modules is illustrated in FIG. 5. In these figures, a typical group-of-picture (GOP) coding structure is presumed. Usually, the first frame of each GOP will be coded as an I-frame. As shown in FIG. 2 and FIG. 3, for simplicity and reduced complexity, only Inter16×16 mode is presumed in pre-analysis. Of course, the present principles are not limited solely to Inter16×16 mode and, thus, other modes may also be used, while maintaining the spirit of the present principles. Moreover, to reduce the mismatch between pre-analysis presumed reference frames and those resulting from actual encoding, instead of using the original input frame for prediction reference, quantization may be applied to generate an approximated encoder reconstruction frame for reference, where the quantization parameter (QP) could be some average QP of the last encoded GOP.

After pre-analysis, the estimated R-Q and D-Q data will then be used in the frame-level rate control module to perform frame-level bit allocation, as shown in FIG. 4. Herein, $R_{Target}$ denotes the target bit rate, $R_{i-1,actual}$ and $D_{i-1,actual}$ respectively denote the actual encoded number of bits and distortion value of the last coded frame, i.e., frame i-1. $R_{i,allocated}$ is the finally allocated bit budget for the current frame, i.e., frame i. Past encoding results, i.e., $R_{i-1,actual}$ and $D_{i-1,actual}$, can be used to adaptively update parameters in the R and D models, e.g., the parameter α as for the proposed D model of Equation (6). The estimated D-Q data via the proposed hybrid distortion model can be applied in several ways to optimize frame-level bit allocation. For example, considering all the remaining frames and satisfying the constraint of the remaining total bit budget, optimal bit allocation is commonly defined by either minimizing the average distortion or minimizing the maximum distortion of the remaining frames. The allocated bit budget of a frame is then sent to MB-level rate control module, which will finally determine an appropriate QP for each macroblock (MB) and is meant to accurately achieve the allocated bit budget. This is illustrated in FIG. 5.

Turning to FIG. 2, an exemplary method for estimating the D-QP data of video frames is indicated generally by the reference numeral 200.

The method 200 includes a start block 205 that passes control to a loop limit block 210. The loop limit block 210 performs a loop for each frame in a video sequence, and passes control to a function block 215. The function block 215 performs motion compensated prediction generating residue data, and passes control to a function block 220. The function block 220 calculates the following for each frame, $\forall QP \in [QP_{min}, QP_{max}]$, $\rho(QP)=0$, and $D_z(QP)=0$, and passes control to a loop limit block 225. The loop limit block 225 performs a loop for each block i in each frame, and passes control to a function block 230. The function block 230 performs a Discrete Cosine Transform (DCT) generating coefficients for a current block, and passes control to a function block 235. The function block 235 performs a fast look-up table calculation for $\{\rho_i(QP), D_{z,i}(QP)\}_{QP}$, and passes control to a loop limit block 240 that ends the loop over each block i, and passes control to a function block 245. The function block 245 calculates the following for each frame, $\forall QP \in [QP_{min}, QP_{max}]$, $\rho(QP)=\rho(QP)+\rho_i(QP)$, $D_z(QP)=D_z(QP)+D_{z,i}(QP)$, and passes control to a loop limit block 250. The loop limit block ends the loop over each frame, and passes control to a function block 255. The function block 255 performs frame-level averaging to obtain $\{\rho(QP), D_z(QP)\}_{QP}$, and passes control to a function block 260. The function block 260 calculates $\forall QP \in [QP_{min}, QP_{max}]$ and $$D(QP) = 1 - \rho(QP), \frac{1}{12}Q^2(QP) + D_z(QP),$$

and passes control to an end block 299.

Turning to FIG. 3, an exemplary pre-analyzer relating to generating estimated rate-distortion model data is indicated generally by the reference numeral 300.

The pre-analyzer 300 includes a combiner 305 having an output connected in signal communication with an input of a transformer 310. An output of the transformer 310 is connected in signal communication with an input of a fast look-up table 315 and with an input of a quantizer 325. An output of the fast look-up table 315 is connected in signal communication with an input of a frame level ρ-Q data and D-Q data calculator 320.

An output of the quantizer 325 is connected in signal communication with an input of an inverse quantizer 330. An output of the inverse quantizer 330 is connected in signal communication with an input of an inverse transformer 335. An output of the inverse transformer 335 is connected in signal communication with a first non-inverting input of a combiner 340. An output of the combiner 340 is connected in signal communication with an input of a reference picture buffer 345. An output of the reference picture buffer 345 is connected in signal communication with a second input of a motion estimator 350. An output of the motion estimator 350 is connected in signal communication with an input of a motion compensator 355. An output of the motion compensator 355 is connected in signal communication with a second non-inverting input of the combiner 340 and with an inverting input of the combiner 305.

An input of the combiner 305 and an input of the motion estimator 350 are available as inputs to the pre-analyzer 300, for receiving input video frames. An output of the frame level ρ-Q data and D-Q data calculator 320 is available as an output of the pre-analyzer 300, for outputting frame-level rate control data.

The fast look-up table 315 is used to calculate ρ-Q data and $D_z$-Q data of each macroblock (MB). The frame level ρ-Q data and D-Q data calculator 320 calculates the ρ-Q data and D-Q data using the proposed hybrid model. The motion estimator 350 uses Inter 16×16 mode to generate a motion estimation for use by the motion compensator 355 which, in turn, generates a motion compensated prediction.

A description will now be given regarding the two involved blocks on block-level fast look-up table and frame-level averaging, respectively, in FIG. 2 or FIG. 3.

First, we describe the fast look-up table algorithm for $\rho(QP)$ and $D_z(QP)$ calculation of a transformed block. The concerned quantities of the whole frame can be derived from their corresponding block-level quantities. Note that different video coding standards may have different transforms and/or transform block sizes. For example, in the International Telecommunication Union, Telecommunication Sector (ITU-T) H.263 recommendation (hereinafter the "H.263 Recommendation") and the simple profile of the MPEG-4 AVC Standard, the adopted transform is Discrete Cosine Transform, which is conducted on each 8×8 block of a frame, while in the current version (i.e., non-simple-profile) of the MPEG-4 AVC Standard, the transform is a modified Discrete Cosine Transform for 4×4 blocks. For each transformed block, the fast look-up table algorithm is as follows.

Block-level fast calculation:
(1) Initialization: $\forall QP$, $\rho(QP)=0$, $D_z(QP)=0$.
(2) One-pass table look-up: for each coefficient $Coeff_i$:
  (a) $Level_i = |Coeff_i|$.
  (b) $QP_i = QP\_level\_Table[Level_i]$. QP_level_Table is a table which indicates for each coefficient level the minimum Quantization Parameter (QP) that will quantize a coefficient of that particular level to be zero.
  (c) $\rho(QP_i) = \rho(QP_i)+1$, $D_z(QP_i) = D_z(QP_i) + Coeff_i^2$.
(3) Summation: for each QP, starting from $QP_{min}$ to $QP_{max}$:

$$\rho(QP) = \sum_{qp=QP_{min}}^{QP} \rho(qp), \quad D_z(QP) = \sum_{qp=QP_{min}}^{QP} D_z(qp).$$

After obtaining $\{\rho(QP), D_z(QP)\}_{QP}$ for all the blocks of the frame, one can respectively average this data to get the corresponding frame-level quantities, as shown below. Here, B denotes the total number of blocks in a frame.

Frame-level averaging: for each QP:

$$\rho(QP) = \frac{1}{A} \cdot \sum_{i=1}^{B} \rho_i(QP), \quad (1)$$

$$\text{If } \rho(QP) > 0, D_z(QP) = \frac{1}{A} \sum_{i=1}^{B} D_{z,i}(QP). \quad (2)$$

Otherwise, $D_z(QP) = 0$.

From above, we can see that the $\rho$ and $D_z$ of all the quantization parameters can be calculated via one pass of the QP_level_Table look-up over all the transform coefficients, and the incurred computation cost is fairly low.

With the above described fast calculation algorithm, the proposed hybrid distortion model can achieve highly accurate distortion estimation with very low computation complexity. We implemented this model in an MPEG-4 AVC Standard simple profile encoder, and thoroughly investigated its performance via extensive experimentation. Results show that the proposed hybrid distortion model consistently achieves close-to-optimum estimation accuracy, i.e., the estimated distortion always closely approaches the actual distortion. This estimation performance is improved over other known distortion models. Furthermore, the incurred computation cost is fairly low. Therefore, the proposed distortion model can be generally applied in any rate-distortion optimization based bit allocation problems to replace the existing distortion models, and thus, improve the overall performance of video coding systems.

Turning to FIG. 4, an exemplary frame-level rate controller to which the hybrid distortion model of FIG. 1 may be applied is indicated generally by the reference numeral 400.

The frame-level rate controller 400 includes a first updater 405 having an output in signal communication with a first input of a frame-level bit allocator 410. The frame-level rate controller 400 further includes a second updater 415 having an output connected in signal communication with a second input of the frame-level bit allocator 410.

A first input of the first updater 405 is available as an input to the frame-level rate controller 400, for receiving $R_{Target}$.

A second input of the first updater 405 and a first input of the second updater 415 are available as inputs to the frame-level rate controller 400, for receiving $R_{i-1,actual}$.

A second input of the second updater 415 is available as an input of the frame-level rate controller 400, for receiving $D_{i-1,actual}$.

A third input of the second updater 415 is available as an input of the frame-level rate controller 400, for receiving estimated values for R-Q and D-Q data, for example, from the pre-analyzer 300 of FIG. 3.

An output of the frame-level bit allocator 410 is available as an output of the frame-level rate controller 400, for outputting $R_{i,allocated}$.

The first updated 405 is for updating the remaining bits for the remaining frames in the current GOP. The second updater 415 is for updating R and D modeling parameters. The frame-level bit allocator 410 is for performing a frame-level bit allocation for the remaining frames in the current GOP.

Turning to FIG. 5, an exemplary encoder to which the present principles may be applied is indicated generally by the reference numeral 500.

The encoder 500 includes a combiner 505 having an output in signal communication with an input of a transformer 510. An output of the transformer 510 is connected in signal communication with a first input of a quantizer 515. A first output of the quantizer 515 is connected in signal communication with an input of a variable length coder (VLC) 555. A first output of the variable length coder 555 is connected in signal communication with a first input of a macroblock level rate controller 560 and an input of a frame-level actual encoded bits calculator 565. An output of the macroblock level rate controller 560 is connected in signal communication with a second input of the quantizer 515 and a second input of an inverse quantizer 520. A second output of the quantizer 515 is connected in signal communication with a first input of the inverse quantizer 520. An output of the inverse quantizer 520 is connected in signal communication with an input of an inverse transformer 525. An output of the inverse transformer 525 is connected in signal communication with a first non-inverting input of a combiner 530. An output of the combiner 530 is connected in signal communication with a second input of a frame-level actual encoder distortion calculator 550 and an input of a reference picture buffer 535. An output of the reference picture buffer 535 is connected in signal communication with a second input of a motion estimator and coding mode selector 540. An output of the motion estimator and coding mode selector 540 is connected in signal communication with an input of a motion compensator 545. An output of the motion compensator 545 is connected in signal communication with an inverting input of the combiner 505 and a second non-inverting input of the combiner 530. An output of the frame-level actual encoded bits calculator 565 is connection in signal communication with a first input of a frame-level rate controller 570. An output of the frame-level rate controller 570 is connected in signal communication with a second input of the macroblock-level rate controller 560. An output of the frame-level actual encoded distortion calculator 550 is connected in signal communication with a second input of the frame-level rate controller 570.

A non-inverting input of the combiner 505, a first input of the motion estimator 540, and a first input of the frame-level actual encoded distortion calculator 550 are available as inputs of the encoder 100, for receiving an input video frame.

A second output of the variable length coder 555 is available as an output of the encoder 100, for outputting an encoded video bitstream.

A description will now be given of some of the many attendant advantages/features of the present invention, some of which have been mentioned above. For example, one advantage/feature is an apparatus having a distortion calculator for modeling video encoding distortion by dividing the video encoding distortion into a first portion and a second portion, calculating the first portion using empirical calculations, and calculating the second portion using analytical calculations.

Another advantage/feature is the apparatus having the distortion calculator as described above, wherein the empirical calculations are substantially exhaustive.

Yet another advantage/feature is the apparatus having the distortion calculator as described above, wherein the distortion calculator divides the video encoding distortion by assigning zero quantized coefficient distortion for the first portion and assigning non-zero quantized coefficient distortion for the second portion.

Moreover, another advantage/feature is the apparatus having the distortion calculator that divides the video encoding distortion by assigning zero quantized coefficient distortion for the first portion and assigning non-zero quantized coefficient distortion for the second portion as described above, wherein the zero quantized coefficient distortion is exactly calculated.

Further, another advantage/feature is the apparatus having the distortion calculator that divides the video encoding distortion by assigning zero quantized coefficient distortion for the first portion and assigning non-zero quantized coefficient distortion for the second portion as described above, wherein the distortion calculator calculates values of the zero quantized coefficient distortion for all quantization step sizes using a one-pass look-up over all zero quantized coefficients.

Also, another advantage/feature is the apparatus having the distortion calculator that divides the video encoding distortion by assigning zero quantized coefficient distortion for the first portion and assigning non-zero quantized coefficient distortion for the second portion as described above, wherein the non-zero quantized coefficient distortion is estimated using a random variable with uniform distribution.

Additionally, anther advantage/feature is the apparatus having the distortion calculator as described above, wherein the distortion calculator is comprised in a video encoder that allocates frame bit budgets using the video encoding distortion.

Moreover, another advantage/feature is the apparatus having the distortion calculator as described above, wherein the video encoding distortion is a source coding mean squared error distortion.

Another advantage/feature is an apparatus having a video encoder for encoding image data by modeling video encoding distortion for the image data. The encoder models the video encoding distortion by dividing the video encoding distortion into a first portion and a second portion, calculating the first portion using empirical calculations, and calculating the second portion using analytical calculations.

Yet another advantage/feature is the apparatus having the video encoder as described above, wherein the empirical calculations are substantially exhaustive.

Moreover, another advantage/feature is the apparatus having the video encoder as described above, wherein the video encoder divides the video encoding distortion by assigning zero quantized coefficient distortion for the first portion and assigning non-zero quantized coefficient distortion for the second portion.

Further, another advantage/feature is the apparatus having the video encoder that divides the video encoding distortion by assigning zero quantized coefficient distortion for the first portion and assigning non-zero quantized coefficient distortion for the second portion as described above, wherein the zero quantized coefficient distortion is exactly calculated.

Also, another advantage/feature is the apparatus having the video encoder that divides the video encoding distortion by assigning zero quantized coefficient distortion for the first portion and assigning non-zero quantized coefficient distortion for the second portion as described above, wherein the video encoder calculates values of the zero quantized coefficient distortion for all quantization step sizes using a one-pass look-up over all zero quantized coefficients.

Additionally, another advantage/feature is the apparatus having the video encoder that divides the video encoding distortion by assigning zero quantized coefficient distortion for the first portion and -assigning non-zero quantized coefficient distortion for the second portion as described above, wherein the non-zero quantized coefficient distortion is estimated using a random variable with uniform distribution.

Moreover, another advantage/feature is the apparatus having the video encoder as described above, wherein the video encoding distortion is a source coding mean squared error distortion.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
a distortion calculator for modeling video encoding distortion by dividing the video encoding distortion into a first portion and a second portion, calculating the first portion using empirical calculations, and calculating the second portion using analytical calculations.

2. The apparatus of claim 1, wherein the empirical calculations are substantially exhaustive.

3. The apparatus of claim 1, wherein said distortion calculator divides the video encoding distortion by assigning zero quantized coefficient distortion for the first portion and assigning non-zero quantized coefficient distortion for the second portion.

4. The apparatus of claim 3, wherein the zero quantized coefficient distortion is exactly calculated.

5. The apparatus of claim 3, wherein said distortion calculator calculates values of the zero quantized coefficient distortion for all quantization step sizes using a one-pass look-up over all zero quantized coefficients.

6. The apparatus of claim 3, wherein the non-zero quantized coefficient distortion is estimated using a random variable with uniform distribution.

7. The apparatus of claim 1, wherein the distortion calculator is comprised in a video encoder that allocates frame bit budgets using the video encoding distortion.

8. The apparatus of claim 1, wherein the video encoding distortion is a source coding mean squared error distortion.

9. An apparatus, comprising:
a video encoder for encoding image data by modeling video encoding distortion for the image data, wherein said encoder models the video encoding distortion by dividing the video encoding distortion into a first portion and a second portion, calculating the first portion using empirical calculations, and calculating the second portion using analytical calculations.

10. The apparatus of claim 9, wherein the empirical calculations are substantially exhaustive.

11. The apparatus of claim 9, wherein said video encoder divides the video encoding distortion by assigning zero quantized coefficient distortion for the first portion and assigning nonzero quantized coefficient distortion for the second portion.

12. The apparatus of claim 11, wherein the zero quantized coefficient distortion is exactly calculated.

13. The apparatus of claim 11, wherein said video encoder calculates values of the zero quantized coefficient distortion for all quantization step sizes using a one-pass look-up over all zero quantized coefficients.

14. The apparatus of claim 11, wherein the non-zero quantized coefficient distortion is estimated using a random variable with uniform distribution.

15. The apparatus of claim 9, wherein the video encoding distortion is a source coding mean squared error distortion.

16. A method, comprising;
modeling video encoding distortion, wherein said modeling step comprises:
dividing the video encoding distortion into a first portion and a second portion;
calculating the first portion using empirical calculations; and
calculating the second portion using analytical calculations.

17. The method of claim 16, wherein the empirical calculations are substantially exhaustive.

18. The method of claim 16, wherein said dividing step divides the video encoding distortion by assigning zero quantized coefficient distortion for the first portion and assigning nonzero quantized coefficient distortion for the second portion.

19. The method of claim 18, wherein the zero quantized coefficient distortion is exactly calculated.

20. The method of claim 18, wherein said step of calculating the first portion comprises calculating values of the zero quantized coefficient distortion for all quantization step sizes using a one-pass look-up over all zero quantized coefficients.

21. The method of claim 18, wherein said step of calculating the second portion comprises estimating the non-zero quantized coefficient distortion is estimated using a random variable with uniform distribution.

22. The method of claim 16, wherein said method is performed in a video encoder that allocates frame bit budgets using the video encoding distortion.

23. The method of claim 16, wherein the video encoding distortion is a source coding mean squared error distortion.

* * * * *